Sept. 29, 1964 G. H. DROEGKAMP 3,150,867
COMBINATION SHOCK ABSORBER AND SELF-LEVELLING DEVICE
Filed July 13, 1962
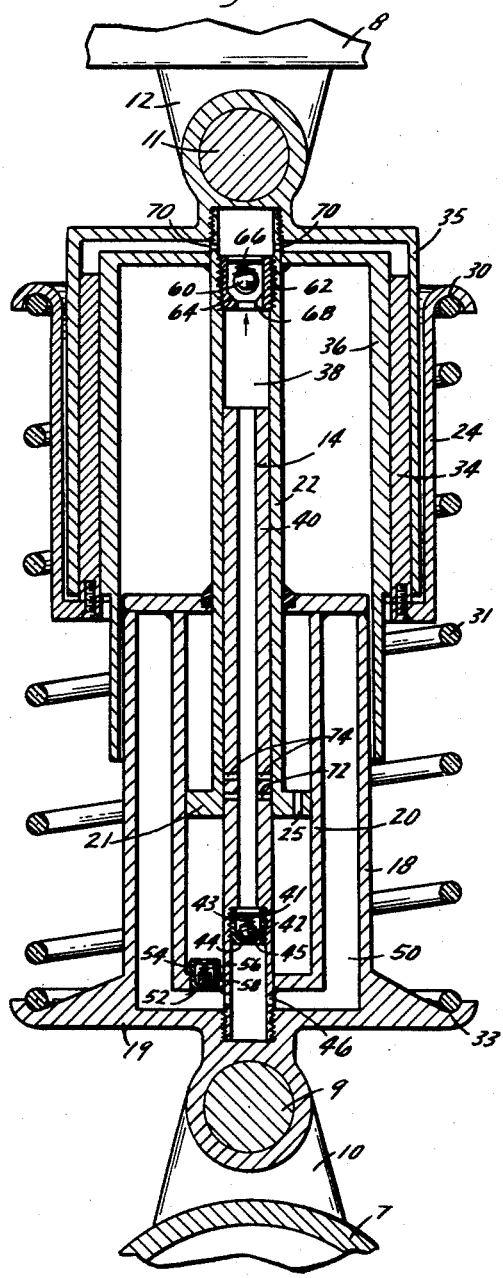
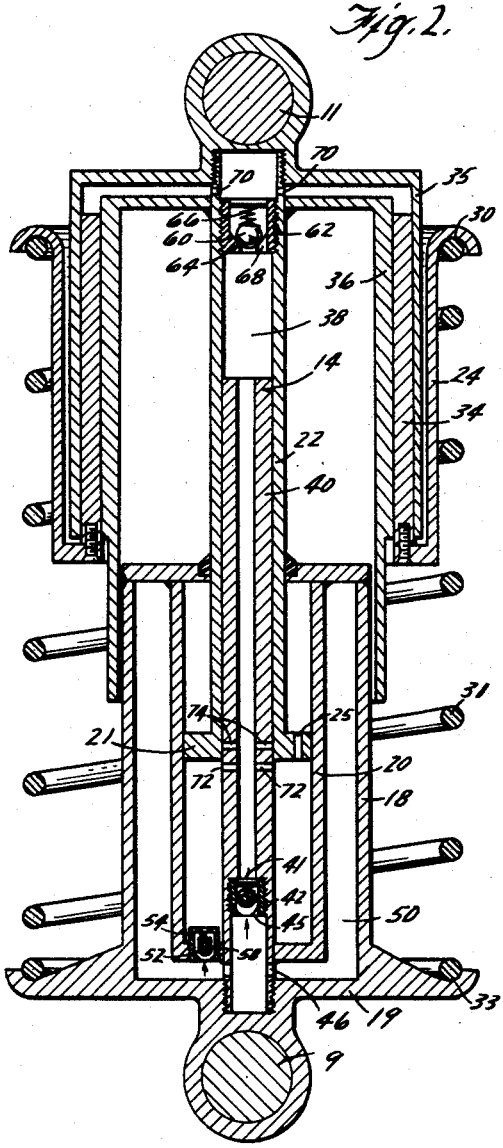
INVENTOR.
GILBERT H. DROEGKAMP
BY
Wheeler, Wheeler & Wheeler
ATTORNEYS.

United States Patent Office 3,150,867
Patented Sept. 29, 1964

3,150,867
COMBINATION SHOCK ABSORBER AND SELF-LEVELLING DEVICE
Gilbert H. Droegkamp, 2001 W. Capitol Drive, Milwaukee, Wis.
Filed July 13, 1962, Ser. No. 209,660
10 Claims. (Cl. 267—8)

This invention relates to a combination shock absorber and self-leveling device. The present application is a continuation in part of my application 38,327, filed June 23, 1960, now abandoned.

The device is applicable either as a supplement to an existing spring or in lieu of other springs as a means of supporting a vehicle frame member from a vehicle axle member. For the purposes thereof, no disclosure of other springing is necessary.

The spring with which this invention is concerned has one seat connected with one of said members and has an adjustable seat movably connected with the other member, subject to fluid pressure control of its position. In the preferred structure disclosed, there is a somewhat conventional shock absorber within the spring and the parts thereof are modified to provide a fluid control valve whereby fluid is admitted under pressure under some circumstances or withdrawn under other circumstances, to or from a cylinder which controls the position of the movable spring seat.

The arrangement is such that when the springing movement occurs in a range in which the frame is unduly close to the axle, the spring seat is adjusted to raise the frame. When normal resilient operation occurs in a range in which the frame is unduly remote from the axle, the spring seat is lowered to restore the frame automatically to its normal position. Thus, according to the range in which resilient movement occurs, the spacing between the supporting member and the supported member is automatically controlled.

Generically it is immaterial whether the fluid pressure which acts on the spring seat is derived from a pressure source extraneous to the device or whether the pressure is developed within the device itself. In the parent application above identified, hydraulic power was derived from an extraneous pressure pump. In the instant device, the entire apparatus is unitary and self-contained. Relative movement between the frame and axle is used to operate a pump for the hydraulic liquid which raises or lowers the spring seat subject to automatic control according to the range in which resilient movement of the frame respecting the axle is occurring.

The device includes a self-contained reservoir in which the hydraulic liquid is stored. The pumping can be accomplished by relative displacement between a piston and cylinder respectively connected with the frame and axle. The control is automatic by reason of the fact that the cylinder has a lateral port opening toward the reservoir so that no pumping occurs if the piston clears this port. This condition exists whenever the frame attains a sufficient elevation above the axle.

One of the objectives of the present invention is to provide a self-contained reservoir without increasing the overall height of the device as compared with that of a conventional shock absorber.

As the simplest way of releasing liquid from the ram for return to the reservoir when the frame is relieved of load, leakage is provided in the pump valve to permit a slow return flow. This return flow is materially less than the displacement of the pump which occurs when the automatic valve permits pumping operation.

There are great advantages in having a device which is entirely unitary so that it may be substituted for other shock absorbing equipment without change and without requiring connection to extraneous sources of power.

It will be apparent from the foregoing that when this device is used in a vehicle it is not only adapted to compensate for excessive frame loading but is also capable of leveling one corner of the frame if the load is not centered.

Superior riding qualities are assured, and the vehicle is protected from the adverse consequences of overload or underload by the arrangement which automatically assures that each spring will function in the most advantageous part of its range and the frame will at all times be centered in a manner such as to preclude it from striking the stops which normally limit downward or upward movement respecting the axle.

In the drawings:

FIG. 1 is a diagrammatic view in axial section through a device embodying the invention as connected to a vehicle frame and axle fragmentarily illustrated.

FIG. 2 is a view similar to FIG. 1 showing the parts in relatively differing positions.

While the device may be used for purposes other than supporting vehicle frames from vehicle axles, it will be exemplified by reference to this preferred usage.

The axle 7 and frame 8 of a vehicle are fragmentarily illustrated. A pivot bolt 9 supported by ears 10 from axle 7 is connected to the base of the unitary device hereinafter described while another pivot bolt 11 mounted in an ear fitting 12 bolted to the frame 8 is connected to the other end of the unitary device.

Except as modified for the purposes of this invention, the shock absorber portion of the regulating device may comprise any convenient dash pot arrangement. As shown, there is a base fitting 19 attached to the axle by the pivot bolt 9. The base fitting indirectly supports a dash pot cylinder 20 within which the piston 21 is reciprocable, the piston having a piston rod 22 in threaded connection with the seating 12 whereby to be pivoted by means of bolt 11 to the frame member 8 through the intervening mounting 12.

Any displacement of the frame member 8 with respect to the axle member 7 will cause the piston 21 to reciprocate in the cylinder 20. The rate of piston movement is subject to control by the flow through the piston port 25 of the fluid contained within the cylinder. It is broadly immaterial to the present invention whether a gas or a liquid is used in dash pot 20, or what means, if any, is used for control of its by-pass flow in the course of piston movement within the cylinder. It is important only that the range within which dash pot movement occurs will be subject to automatic control to remain approximately constant regardless of frame loading.

A compression spring 31 provides, or contributes to, support of the frame 8 from the axle 7. The fitting 19 connected to the axle carries a seat 33 that supports the lower end of compression spring 31. The upper end of spring 31 engages a spring seat 30 carried by housing 24 from an annular piston 34 reciprocable within a cylinder 35 connected by fitting 12 with the vehicle frame. The cylinder is annular, its inner wall being provided by an inner sleeve 36 which is welded to the connecting rod 22 and is thereby also secured to fitting 12 and frame 8. By pumping fluid into the annular space between cylinder 35 and sleeve 36 it is possible to displace the annular piston 34 downwardly, thereby tending to move spring seat 30 closer to spring seat 33 and, conversely, tending to elevate the frame 8 from the axle 7.

Normally there will be no occasion for decreasing normal clearance between the frame and axle. Accordingly FIG. 2 shows piston 34 substantially in its lowermost position.

The device as thus far described functions like any shock absorber. The resilient support of frame member 8 from axle 7 (however achieved) permits relative movement between these connected parts. The frame may move downwardly or the axle may move upwardly to compress the spring 31. In normal operation, the initial position of the piston 21 will be approximately as shown, somewhat above the center of the cylinder 20 in which it operates. Its range of movement will lie within the axial extent of the cylinder 20. The movement within that range will be damped by the dash pot, subject to such leakage past the piston 21 as is permitted in any desired manner.

However, if the loading of the frame is either increased or decreased from normal, the initial position of piston 21 in cylinder 20 will vary downwardly or upwardly from the point at which the piston is illustrated. The present invention contemplates a means for automatically correcting this condition by raising or lowering the seat 30 for spring 31. This is achieved in the following manner.

A pump generically designated by reference character 14 is connected between the frame and the axle to pump liquid to the ram whenever relative reciprocation occurs below the desired range. Instead of making this pump as a separate item it is desirably built into the shock absorber. The shock absorber piston rod 22 is made hollow to provide a pump cylinder 38 in which operates a tubular pump piston 40 screwed at its lower end to the base 19. Near the lower end of the piston rod 40 is a valve chamber 41 in which there is a ball check valve 42 urged by spring 43 toward a seat 44 which is laterally grooved at 45 so that the ball does not seat tightly thereon.

A duct 46 leads from the lower end of the tubular piston rod 40, below the valve seat, to a liquid reservoir 50 which is formed within the upstanding tubular wall 18 of the base housing 19. The reservoir 50 also communicates with the interior of cylinder 20 subject to the control of a check valve 52 mounted in a valve casing 54 and biased to its seat by a compression spring 56. The valve has a minute duct at 58 which serves as a by-pass to permit some flow past the valve even when the valve is closed.

Another valve is provided at 60 near the upper end of the tubular connecting rod 22. It is mounted in a valve housing 62 threaded into the connecting rod and having a seat at 64 to which the ball valve 60 is normally urged by a valve spring 66. A radial slot at 68 through the seat provides a bypass for minute flow even when the valve is seated. Above the valve casing, ducts 70 open laterally from the tubular connecting rod 22 into the annular cylinder 35 in which the annular piston 34 is reciprocable. Due to the ball check valves 42 and 60 each reciprocation of piston 40 in cylinder 38 will normally cause some of the hydraulic liquid stored in reservoir 50 to be pumped upwardly into the cylinder 35 to displace the annular piston 34 in the cylinder. This will result in an increase in the compression of spring 31 and when the spring is compressed to such a point that it can sustain increased loading of frame 8, there will be a tendency to raise the frame with respect to the axle. Thus, repeated reciprocation of the piston 40 of pump 14 in the cylinder 38 in response to successive road shocks during normal operation of the vehicle would continue to jack up the frame with respect to the axle were it not for the fact that when the frame is above a predetermined position respecting the axle, by-pass of liquid pumped can occur at an increased rate.

It will be understood that regardless of the automatic control of frame elevation, the shock absorber piston 21 will continue to reciprocate in its cylinder 20 within a predetermined range which is something less than the height of cylinder 20. As the parts are illustrated in FIG. 1 the frame is moving downwardly toward the axle and the pump plunger 40 is displacing liquid from cylinder 38 upwardly from the ball check 60 into the annular cylinder 35 to displace the annular piston 34. The downward movement of the shock absorber piston 21 is displacing some fluid which by-passes the piston through port 25 and it is by-passing another increment of fluid from the lower part of cylinder 20 through the by-pass duct 38 in the lower check valve 52.

However, if the height of the frame above the axle were to increase materially the shock absorber piston would uncover first the ducts 72 and then the ducts 74 in the tubular plunger 40, thus placing the interior of plunger 40 in communication with the lower end of cylinder 20. Thereupon, a portion of the fluid which would normally be displaced upwardly through the ball check 60 will now be displaced downwardly between piston 21 and the lower end of cylinder 20 to by-pass check valve 52 and flow back to the reservoir. This automatically reduces the displacement of pump 14 after the vehicle frame reaches a desired mean level above the axle.

Due to the fact that by-pass leakage is provided through the radial slits in the seats of the ball checks, there is also a continued flow of liquid from the annular cylinder 35 back to the reservoir under all conditions. Thus there is a constant tendency to relieve the compression of spring 31 and permit the frame to lower with respect to the axle. However, with the vehicle in operation, as soon as the frame is at an unduly low level respecting the axle, the connecting rod 22 covers the ports 72 and 74, acting like a sleeve valve to reduce the rate of return flow to the reservoir and thereby to increase the net of liquid delivery into the annular cylinder 35 to increase the compression of spring 31 and raise the frame. Thus, the control of the normal range of frame movement is automatically achieved.

FIG. 2 shows the parts as they appear when the frame and axle are moving away from each other. Under these conditions, ball check 60 is seated while the ball check 42 and the check valve 52 are free of their respective seats to permit the shock absorber piston 21 to draw fluid from reservoir 50 into the cylinder 20 and to permit tubular plunger 40 to suck fluid from the reservoir 50 into the cylinder 38. It will be observed in the illustrated position of the parts that some such fluid will be drawn through the uncovered port 72 from the shock absorber cylinder 20 and some will be drawn past check valve 42 directly from the reservoir 50.

The displacement of the pump is so nominal that the increase in bias of spring 31 will be very slight in any given reciprocation. It is only by repeated operation of the pump piston 40 in the pump cylinder 38 that appreciable change in bias of spring 31 is achieved. When the bias reaches a value such that the shock absorber is operating in a higher range than normal, the opening of the ports 72 and 74 will permit an increase in the rate of return which will at least equal the amount pumped from the reservoir, thus precluding any further elevation of the frame.

Thus the device is self-contained and entirely automatic in its operation and it will automatically correct either for underload or overload to maintain the frame and axle at a mean spacing in which the shock absorbing action will occur in a predetermined range. The operation of the pump not only contributes to the shock absorbing action but also maintains the parts in the selected range.

It will be noted that in this device the valve 5 not only accommodates any displacement of piston 21 in excess of the capacity of cylinder 20 above the piston, but it also facilitates make-up of shock absorber liquid from the same reservoir 50 which provides for automatic control of the range in which the shock absorber piston operates.

Of course the present showing, particularly with respect to the valves, is intended to be diagrammatic.

I claim:

1. The combination with relatively movable spring-supported and supporting members respectively provided with spring seats relatively movable and fixed regarding respective members of a spring operatively engaged with the spring seats and at least contributing to the support of the supported member from the supporting member, means for guiding the movable spring seat for movement in a direction to increase and decrease spring bias, a reservoir containing hydraulic liquid, a pump comprising a pump cylinder and piston, the cylinder having valved liquid intake means connecting it with the reservoir and being provided with a lateral return port communicating with the reservoir and for which the piston and cylinder have cooperating parts constituting a valve, a ram comprising a ram cylinder and a ram piston connected between the movable spring seat and its respective member for effecting displacement of the movable spring seat in a direction to increase spring bias, means comprising a duct having a check valve and providing communication between the pump cylinder and the ram cylinder, whereby movement of the pump piston in the pump cylinder will tend to displace liquid from the reservoir into the ram cylinder for the movement of the movable spring seat away from its respective member, and means for leaking liquid from the ram cylinder toward the reservoir at a rate less than the rate at which liquid is pumped from the reservoir to the ram cylinder when the valve constituted by said pump piston and said pump cylinder ports is closed.

2. In a self-levelling device for connection between the axle and the spring-supported frame of a vehicle, the combination with terminals for frame and axle connection, of a spring seat connected with one of said terminals, a second spring seat movable with respect to the first spring seat and with respect to the other of said terminals, means for guiding said second spring seat for reciprocation respecting said other terminal, a spring confined between said spring seats, a ram comprising a ram piston and a ram cylinder operatively connected between the other terminal and second spring seat and constituting means for moving the other spring seat toward the first spring seat in opposition to said spring whereby to tend to increase the separation between said terminals, a fluid pump adapted to be actuated by normal road-induced movement between the frame and axle and comprising piston and cylinder parts respectively connected with said terminals whereby the parts have relative reciprocation in consequence of relative movement between said terminals, means providing a fluid passage leading from the pump cylinder part to the ram cylinder and having a control valve, means providing a fluid inlet passage leading to said pump cylinder part and having a control valve, means for continuously bleeding fluid from the ram cylinder at a rate less than the rate at which fluid is normally pumped into said ram cylinder by said pump, and means for automatically reducing the pumping rate to a rate approximating the said rate of continuous bleeding when said terminals reach a predetermined average separation.

3. A self-levelling device according to claim 2 in which said last mentioned means comprises a bypass port opening from said pump cylinder, and slide valve means for opening and closing the port in predetermined relative positions of said terminals.

4. A self-levelling device according to claim 3 in which the pump cylinder part comprises a shock absorber connecting rod having a terminal piston and in further combination with a shock absorber cylinder having means mounting it in fixed connection with a piston part of said pump, the said port opening into the shock absorber cylinder and the slide valve controlling such port comprising a portion of the pump cylinder part, the shock absorber cylinder having a duct opening into a reservoir with which said one terminal is provided and from which the inlet passage aforesaid leads to the pump cylinder part.

5. In a self-levelling device for connection between the axle end and the spring-supported frame of a vehicle, the combination with an axle terminal provided with a spring seat and having a reservoir and a pump plunger connected therewith, a frame terminal having a pump cylinder and a ram cylinder connected therewith, the pump plunger being reciprocable in the pump cylinder in the course of normal road-induced movement between the terminals when connected with the frame and axle of a vehicle, a ram reciprocable in the ram cylinder, a second spring seat connected with the ram, a spring interposed between the spring seats and contributing to the support of the frame terminal from the axle terminal, means providing a duct from the pump cylinder to the ram cylinder, a check valve controlling flow through the duct, means for accommodating leakage from the ram cylinder back to the pump cylinder past the valve, means providing an inlet duct for the pump cylinder from the reservoir, a check valve controlling said inlet means, and means for accommodating leakage past the last mentioned check valve from the pump cylinder to the reservoir, whereby leakage flow from the ram cylinder can return through the pump cylinder to the reservoir, the normal pumping rate of the pump in the course of road-induced relative movement between said terminals exceeding the rate of leakage returning from the ram cylinder to the reservoir, the excess of the pumping rate over the leaking rate effecting increased spring support for the frame.

6. A self-levelling device according to claim 5 in further combination with means for reducing the pumping rate to approximate the rate of leakage when the normal range of relative movement between said terminals exceeds a predetermined mean level.

7. A self-levelling device according to claim 5 in further combination with a shock absorber cylinder within the reservoir and a shock absorber piston reciprocable in the cylinder and connected with the pump cylinder, the pump cylinder constituting a connecting rod extending from the frame connection terminal, and the shock absorber cylinder being connected with the axle-connected terminal and having restricted communication with the reservoir and having a check valve controlling such communication.

8. A self-levelling device according to claim 7 in which the pump plunger is tubular and constitutes a part of the means providing an inlet duct from the reservoir to the pump, the pump plunger having lateral port means with respect to which the pump cylinder is movable to constitute a slide valve for opening and closing the port means in the relative displacement between the pump plunger and pump cylinder, said port means opening into the shock absorber cylinder for return therethrough to the reservoir of a portion of liquid received from the reservoir into the pump.

9. A self-levelling device for connection between the axle and the spring-supported frame of a vehicle, said device including an axle connection terminal and a frame connection terminal, a fitting mounted on the axle connection terminal and comprising a central reservoir and a peripheral spring seat, a spring on the seat surrounding the reservoir, a pump plunger tube connected with said fitting within the reservoir and having port means providing communication between the reservoir and the interior of the tube, a check valve controlling flow through said port means, a pump cylinder connected with the frame connected terminal, said plunger tube being reciprocable in the pump cylinder, a ram cylinder connected with the frame connected terminal, a ram reciprocable in the ram cylinder and provided with a second seat engaged with the spring to receive support therefrom, the pump cylinder having lateral port means providing communication with the ram cylinder, check valve means for controlling flow through the last mentioned port means, and means providing bypass leakage from the ram cylinder to the reservoir at a rate normally less than the pumping rate of the pump plunger tube and the pump cylinder, and means for substantially equalizing the pumping rate and bypass leakage when the ram piston reaches a predetermined displacement.

10. A self-levelling device according to claim 9 in further combination with a shock absorber cylinder fixed centrally within the reservoir and surrounding the pump plunger, port means providing communication between the shock absorber cylinder and the reservoir, check valve means controlling said last port means, a shock absorber piston connected with the pump cylinder and reciprocable in the shock absorber cylinder, the pump plunger tube having laterally opening port means constituting part of said equalizing means and positioned to be covered and uncovered by the pump cylinder in the course of relative reciprocation in the course of road-induced movement of the frame-connected terminal respecting the axle-connected terminal, the extent to which said last port means are uncovered depending upon the range in which such road-induced movement occurs, according to the mean spacing between said terminals.

References Cited in the file of this patent

UNITED STATES PATENTS

| | | |
|---|---|---|
| 2,436,573 | Heynes | Feb. 24, 1948 |
| 2,571,449 | Hobbs | Oct. 16, 1951 |
| 2,592,391 | Butterfield | Apr. 8, 1952 |
| 2,879,057 | Heiss | Mar. 24, 1959 |

FOREIGN PATENTS

| | | |
|---|---|---|
| 849,342 | Great Britain | Sept. 28, 1960 |